United States Patent [19]

Goller et al.

[11] 4,287,232
[45] Sep. 1, 1981

[54] DRY FLOC METHOD FOR MAKING AN ELECTROCHEMICAL CELL ELECTRODE

[75] Inventors: Glen J. Goller, West Springfield, Mass.; Joseph R. Salonia, Middletown, Conn.

[73] Assignee: United Technologies Corporation, Hartford, Conn.

[21] Appl. No.: 920,036

[22] Filed: Jun. 28, 1978

[51] Int. Cl.³ .................... H01M 4/96; B05D 1/30
[52] U.S. Cl. .................................. 427/113; 427/115; 427/369; 427/376.1; 427/376.6; 427/180; 427/185; 427/296; 429/42
[58] Field of Search ............... 427/42, 113, 115, 369, 427/376 R, 376 E, 185, 296, 180, 376.1, 376.6; 429/42

[56] References Cited

U.S. PATENT DOCUMENTS

| 2,961,712 | 11/1960 | Davis | 427/215 |
| 3,080,258 | 3/1963 | Davis | 427/215 |
| 3,342,627 | 9/1967 | Paxto | 427/113 |
| 3,385,736 | 5/1968 | Diebert | 204/290 |
| 3,457,113 | 7/1969 | Deibert | 204/290 |
| 3,591,421 | 7/1971 | Schultze | 427/113 |
| 3,829,327 | 8/1974 | Omori | 427/249 |
| 3,857,737 | 12/1974 | Kemp | 427/113 |
| 3,900,602 | 8/1975 | Rummel | 427/115 |
| 4,129,633 | 12/1978 | Biddick | 264/40.3 |
| 4,175,055 | 11/1979 | Goller et al. | 427/122 |

FOREIGN PATENT DOCUMENTS 1163479 9/1969 United Kingdom .

*Primary Examiner*—Ronald H. Smith
*Assistant Examiner*—Richard Bueker
*Attorney, Agent, or Firm*—Stephen E. Revis

[57] ABSTRACT

A method for making an electrochemical cell electrode involves depositing a layer of dry carbon/hydrophobic polymer floc powder on the surface of a substrate by dispersing the powder as a cloud in a chamber over the substrate and pulling the powder onto the substrate by drawing a vacuum under the substrate. The electrode is subsequently compacted and sintered. Typically the carbon component of the floc is catalyzed, such as with platinum. Thus, the method is for applying a catalyst layer on an electrode substrate. The method is particularly adapted to the high speed manufacture of electrodes.

14 Claims, 1 Drawing Figure

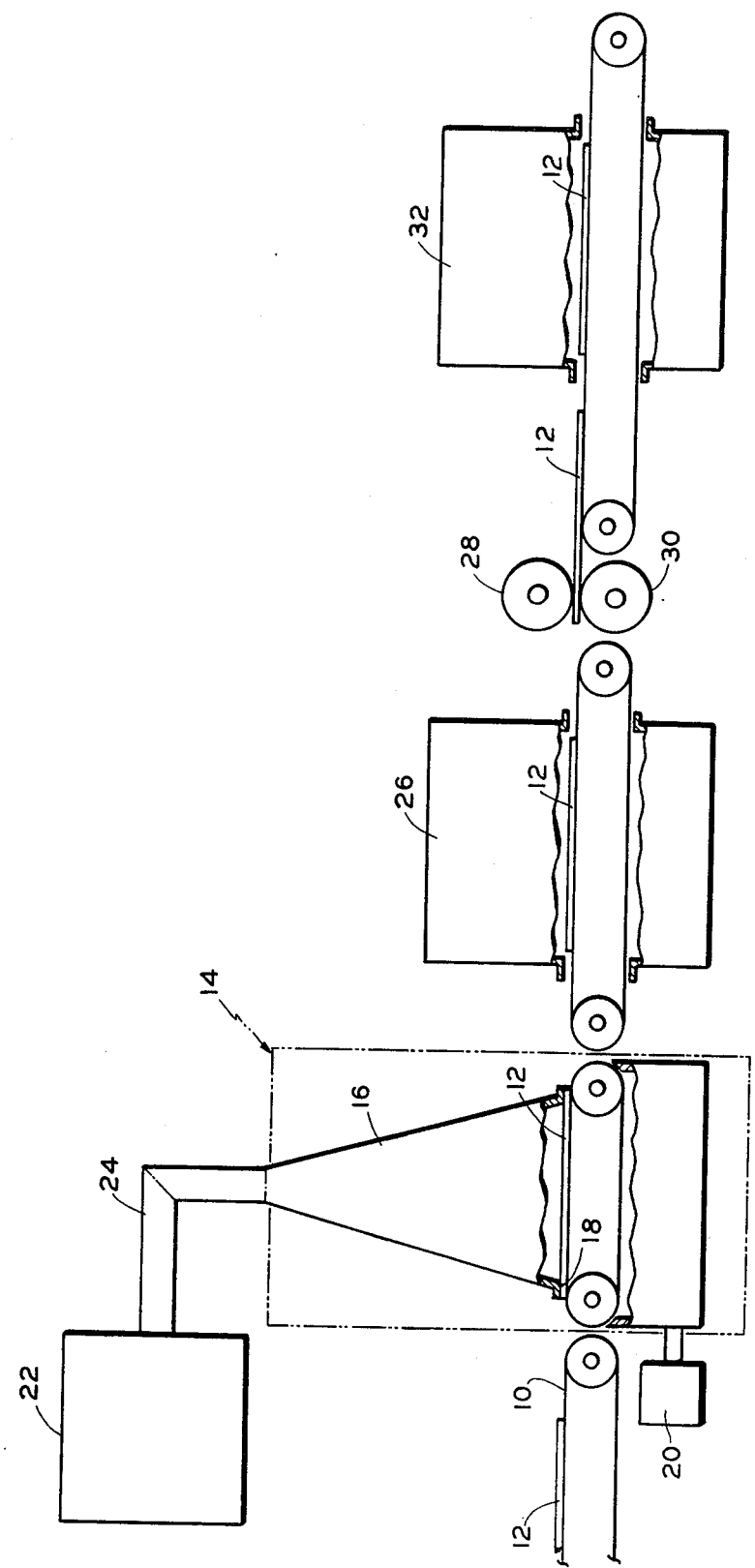

DRY FLOC METHOD FOR MAKING AN ELECTROCHEMICAL CELL ELECTRODE

BACKGROUND OF THE INVENTION

1. Field of the Invention

This invention relates to electrochemical cell electrodes and, more particularly, a method for making said electrodes.

2. Description of the Prior Art

Electrodes for use in electrochemical cells such as fuel cells are well known in the art. One common type of electrode is the gas diffusion electrode. A pair of gas diffusion electrodes are disposed on either side of a compartment containing a matrix which is soaked with electrolyte. A catalyst is disposed on the electrolyte facing surface of each electrode. Hydrogen is fed to the back side of one electrode while oxygen or air is fed to the back side of the other electrode. The gases enter the electrodes and react with the electrolyte in the presence of the catalyst.

Many types of gas diffusion electrodes are described in the literature. One type of gas diffusion electrode comprises a layer of polytetrafluoroethylene (PTFE) mixed with a catalyst supported on carbon particles (i.e., catalyzed carbon), said layer being disposed on the surface of a porous carbon substrate (e.g., carbon paper). The PTFE prevents the electrolyte from filling up the electrode to such an extent that sufficient fuel or oxidant cannot reach the catalyst. A gas diffusion electrode of this type is described in column 5 of commonly owned U.S. Pat. No. 3,857,737 to Kemp et al.

Another type of gas diffusion electrode comprises a carbon paper substrate with a layer of uncatalyzed carbon mixed with PTFE applied to the surface thereof; unsupported catalyst is then applied to the carbon/PTFE layer. An electrode of this type is described in commonly owned U.S. Pat. No. 3,972,735 to Breault.

One technique for applying either the catalyzed carbon/PTFE layer or the uncatalyzed carbon/PTFE layer to a substrate is the direct filtration method. In that method carbon powder (catalyzed or uncatalyzed) and an aqueous PTFE dispersion are blended into an alcohol/water solution to form a co-suspension of carbon and PTFE therein. The suspension is caused to floc, such as by heating or adding a floccing agent. Floccing is the coalescence of the catalyzed or uncatalyzed carbon particles with the PTFE particles. A proper floc is one which achieves uniform size agglomerates of catalyzed or uncatalyzed carbon and PTFE particles and a homogeneous distribution or mix of the particles. After floccing, excess liquid is decanted and the floc is applied to the surface of a carbon paper substrate which acts as a filter. Liquids pass through the substrate and a layer of the desired solids mixture (i.e., the floc) remains on the surface of the substrate. The article is dried, compacted, and sintered. If the applied layer does not include catalyst, a separate catalyst application step would be required.

A related technique is the indirect filtration (or filter transfer) method wherein the layer of floc is applied to the substrate by first filtering it onto special filter paper instead of onto the carbon paper substrate. The layer is then transferred from the filter paper onto the carbon paper, dried, compacted, and sintered as in the direct filtration method.

Satisfactory electrodes have been made by both of the foregoing filtration methods; however, these techniques are slow, expensive, and not suitable for production runs wherein hundreds and thousands of electrodes must be made in a relatively short period of time at minimal cost.

It has been our experience that different methods for applying a carbon/PTFE layer usually result in an electrode with different performance characteristics. One reason for this is that the arrangement of carbon and PTFE particles relative to each other in the layer, the precise nature of the particles themselves (such as their surface chemistry), and the uniformity of the layer and imperfections in the layer often vary from method to method. For example, a layer formed by first applying carbon powder to the substrate and then infiltrating the carbon powder with PTFE yields a completely different structure than that formed by preparing a co-suspension of carbon and PTFE, floccing the co-suspension, and applying the wet floc to the substrate.

Thus, it is not a small task converting from an expensive, slow, electrode fabrication method which is known to produce highly satisfactory electrodes, to a faster, more economical production type fabrication process.

Two patents which relate to methods for applying materials to fuel cell electrode substrates and which, therefore, may be of general interest to the subject matter of the present application, are U.S. Pat. No. 3,573,991 Lenfant et al and U.S. Pat. No. 3,591,421 Schultze et al. The former is directed to the use of electrostatic projection for the purpose of forming a variety of layers which constitute an electrode. Electrostatic projection involves imposing a charge on a support, imposing an opposite charge on the particles of a powdered material which is to be applied to the support as a layer, and fluidizing the charged particles of powder above the oppositely charged support. The powder is attracted to the support and coats the support to a thickness which is dependent upon a number of parameters.

Experiments have been conducted using electrostatic projection to apply a dry carbon/PTFE floc to a carbon paper substrate but were unsuccessful due to the inability to apply a proper charge distribution to the floc.

Schultze et al, in column 6 at lines 19–25, indicates that a hydrophobic polymer powder can be distributed within the pores of a porous substrate by moving the substrate through a chamber in which fine particles of the hydrophobic polymer powder are uniformly whirled up and thrown against an exposed face of the substrate while applying an intermittent vacuum to the opposite face. The express object of Schultze et al is to obtain a specified density distribution of hydrophobic polymer within the pores of the substrate. Later heating of the substrate fixes the polymer particles to the walls of the pores as discussed in column 5 at lines 44–53. As will become clear from the description of applicants' invention as set forth hereinbelow, applicants' method is not for the purpose of wetproofing the substrate nor does it introduce a hydrophobic polymer into the pores thereof. Rather, it is a method for applying a layer of carbon/polymer dried floc powder on the surface of a substrate which is usually already wetproofed.

SUMMARY OF THE INVENTION

An object of the present invention is an improved method for manufacturing electrochemical cell electrodes.

Another object of the present invention is a method for making reproducible electrodes on a continuous basis.

A more specific object of the present invention is an improved method for applying a carbon/hydrophobic polymer layer to the surface of an electrode substrate, and more particularly, for applying a precatalyzed carbon/PTFE layer to the surface of an electrode substrate.

Accordingly, the improved method for making an electrode comprises the steps of applying a uniform layer of dry, powdered, carbon/hydrophobic polymer floc on the surface of a substrate by dispersing the floc as a cloud of powder in a chamber over the substrate and pulling the powdered floc onto the substrate by drawing a vacuum under the substrate; compacting the applied floc layer; and sintering the compacted article.

The term "sintering" as used above and hereinafter in the specification and claims means heating to a temperature sufficiently high for a sufficient length of time to result in a bonding of the floc particles to each other and to the substrate and to provide partial hydrophobicity to the floc layer. Temperatures should not be so high as to cause the polymer to degrade.

In the specification and claims a flock "particle" is an agglomerate comprising both carbon particles and polymer particles in a fixed relationship to each other as determined by the floccing process.

"Carbon," as that word is used in referring to the carbon in the carbon/hydrophobic polymer layer, is intended to include within its meaning graphite, acetylene black, carbon black and the like. Unless otherwise stated it also encompasses precatalyzed as well as uncatalyzed carbon, wherein a catalyst such as platinum is disposed on the surface of the carbon particles such that the carbon is a support for the catalyst.

It was found that electrodes can be made according to the present invention which will surpass in performance electrodes made by prior art techniques. Yet, electrodes may be made faster by the present method, are more easily reproducible, more economical, and may be reliably manufactured by persons unskilled in any form of chemical technology. It has also been determined that the carbon/hydrophobic polymer layer of electrodes made by the method of the present invention is free of certain types of structural defects which are present in prior art electrodes. The improved performance was an unexpected bonus.

In phosphoric acid fuel cells we prefer to use resin bonded, wetproofed, fibrous carbon paper substrates having an open porosity of from 60-90%. However, any porous substrate compatible with the fuel cell environment in which it is to be used is likely to be satisfactory in the method of the present invention. Substrates already used successfully in fabricating electrodes by other methods are particularly recommended. A nickel screen may be a suitable substrate for an electrode which is to be used in a base electrolyte cell. A carbon paper substrate may be made, for example, by carbonizing a fiber such as nylon or rayon by heating at about 1300°-1500° F. The carbonized fibers may then be cut to the desired length and made into paper by any one of the well known paper making processes. The paper may be graphitized by further heating. Carbon paper can be purchased from various manufacturers such as Union Carbide Company, Stackpole Carbon Company, and Kreha Corporation. Typically the carbon paper is wetproofed such as by dipping it into an aqueous solution of PTFE or other suitable hydrophobic polymer.

The floc of the present invention (prior to the step of drying) may be any carbon/hydrophobic polymer floc which is known to have been or which may be successfully applied to electrode substrates by prior art techniques, such as by spraying, filtration, or spreading with a doctor blade. A preferred floc is made by blending catalyzed carbon powder and an aqueous PTFE dispersion in an alcohol/water solution and then causing the co-suspension of carbon and PTFE to floc. According to the present invention the floc is then dried and pulverized to a fine powder and applied to the substrate in a manner taught herein. The above mentioned catalyzed carbon may be made, for example, by the method described in commonly owned U.S. Pat. No. 3,857,737 to Kemp et al. Another example of a precatalyzed carbon which may be used is the precatalyzed carbon described in U.S. Pat. No. 4,044,193 to Petrow et al. The method for making the precatalyzed carbon used in preparing the floc is not considered to be a part of the present invention.

Commonly owned U.S. Pat. No. 4,185,131 titled "Screen Printing Method For Making An Electrochemical Cell Electrode" by G. Goller, V. Petraglia, and G. Dews filed on even date herewith describes a screen printing method for applying a carbon/hydrophobic polymer layer to a substrate. That method is limited to using uncatalyzed carbon; thus, a separate catalyzation step is required after the layer is applied. An important advantage of the present method is that it is equally well suited for use with a floc made with precatalyzed carbon powder as with uncatalyzed carbon powder. The use of precatalyzed carbon in the preparation of the floc eliminates the necessity of a catalyzation step after the layer has been applied to the substrate.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a schematic illustration of an automated system for applying the carbon/PTFE layer to a porous electrode substrate in accordance with a preferred embodiment of the present invention.

DESCRIPTION OF THE PREFERRED EMBODIMENT

Referring to FIG. 1, a conveyor belt 10 feeds a substrate 12 which is to be coated into cloud chamber apparatus generally represented by the numeral 14. The substrate 12 is precisely positioned under a pyramid-like chamber 16. Suitable mechanical means, not shown, serve to move the substrate 12 relative to the chamber 16 such that the bottom edge 18 of the chamber 16 fits tightly against the outside edge of the substrate. A turbine 20 provides a controlled vacuum pressure under the substrate 12. In our operation we have used a vacuum of from 5-25 inches of water. The best vacuum pressure will depend upon the porosity of the substrate and other factors, but can be readily determined with a few trial runs.

Apparatus represented by the box 22 automatically measures a predetermined amount of dried carbon/PTFE floc. As soon as the turbine 20 is turned on, the premeasured floc, in the form of a powder, is drawn into the chamber 16 via the conduit 24 and is quickly drawn to the exposed surface of the porous substrate 12. Since the powder blocks the pores of the substrate, the flow of air (with powder entrained therein) toward an area diminishes as the area is covered with powder. Areas with less powder will therefore receive more of the remaining powder. A few percent of the powder will probably pass through the substrate. The net result is a very uniform thickness of powder over the entire surface of the substrate with virtually no powder within the pores of the substrate.

In this preferred embodiment the substrate is held in position with the vacuum on for a long enough time to ensure that essentially all the measured amount of powder admitted into the chamber 16 has been deposited on the substrate or has passed therethrough. Since the amount which passes through is essentially constant for a particular type of substrate, the proper amount of powder to be introduced into the cloud chamber to achieve any desired catalyst loading may be precisely determined with a few trial runs.

An alternate method for applying the powder according to the present invention is to introduce a large excess of powder into the chamber over the substrate and to keep the powder whirling in a cloud over the substrate (e.g., with air jets) while simultaneously applying the vacuum. The substrate is removed from the chamber after a predetermined amount of time which is calculated to yield the appropriate buildup of powder on the substrate. We have used this technique successfully, but prefer the former technique because it is more readily adaptable to high speed operation, it is easier to control the amount of powder applied to the substrate, and the apparatus is less complicated because a device for continuously "whirling" the powder over the substrate is not required.

After application of the appropriate amount of powder to the substrate, the substrate is automatically moved through subsequent stages of the electrode fabrication process, which, in this preferred embodiment, comprise a relatively low temperature drying step in an oven 26, followed by a compacting step at rollers 28, 30, and a high temperature sintering step in oven 32. The compacting and sintering steps are well known in the art.

A preferred substrate for use in the method of the present invention is graphitized carbon paper made from carbon fibers. The carbon paper is preferably wetproofed by impregnating it with from 2-10 mg/cm$^2$ PTFE such as by dipping the carbon paper in a solution of TFE-30 containing 26% PTFE solids. TFE-30 is an aqueous dispersion of about 0.2 micron size PTFE particles with surfactant (Triton X-100) and is manufactured by Dupont Co. The impregnated carbon paper is dried at 160°±10° F. for 25 minutes. It is then placed in a bath of isopropanol to leach out most of the surfactant. This leaching step is optional since the surfactant may be removed during later steps in the electrode manufacturing process. Finally the substrate is heated to 640° F. and held for 20 minutes. The carbon paper used to prepare the substrate may be made by any suitable means such as the method described in commonly owned U.S. Pat. No. 3,972,735 or in U.S. Pat. No. 3,829,327. It is also sold commercially.

Generally, persons desiring to practice the method of the present invention will have a porous substrate which they have been using in the past to fabricate electrodes by other methods. It is believed that any such substrate may be used with success in the method of the present invention. We have used substrates with porosities as low as 60% and as high as 90%. The method of the present invention works equally well over this entire range. Generally speaking, and notwithstanding the method of the present invention, substrates with higher porosity have been found to make better electrodes. For this reason we most prefer substrates with porosities of at least 80%.

EXAMPLE

The following recipe and procedure is for preparing a quantity of dry floc in accordance with the present invention sufficient to manufacture seventy electrodes, each having an area of about one square foot.

1. Add 32.2 liters of distilled water to a 15 gallon stainless steel mixing vat having a variable speed agitator disposed in the center thereof.

2. Into a commercial Waring blender containing 3.3 liters of distilled water, slowly add 122.5 grams of catalyzed carbon powder. A suitable catalyzed carbon powder comprises 10% by weight platinum and 90% by weight carbon. Blend at high speed for ten minutes. Pour the blended contents into the aforementioned steel vat with the impeller set for high speed agitation. A swirling vortex is an indication of proper blending speed.

3. Repeat step 2 using the same proportions of materials, and after adding to the vat continue the high speed mixing in the vat for 20 minutes.

4. Add 2.576 liters of water to a five-liter beaker and pour 233 milliliters of a TFE-30 dispersion containing 60% solids into the beaker and stir by hand.

5. Very gradually (over a period of about 1-2 minutes) pour the PTFE dispersion into the swirling vortex of the vat and turn down the impeller speed to permit moderate agitation. The vat now contains a co-suspension of catalyzed carbon particles and PTFE particles.

6. Heat the contents of the vat up to 135° F. while continuously stirring, and immediately remove the vat from the heat at the 135° F. temperature point and transfer its contents into a clean vessel at room temperature. This heating causes the co-suspension to floc. Continue stirring in the new vessel until ready for filtration. The suspension should be allowed to reach room temperature.

7. Add 67 milliliters of 85% $H_3PO_4$ to the floc suspension approximately 5-10 minutes prior to filtration. As is explained in greater detail later in the specification, the acid is for the purpose of reducing burning of the electrode during a later heating step in the manufacture of the electrode. Most of this acid is lost during the following filtration step. Only a very small amount of acid ends up in the finished dry floc powder (less than one percent by weight of the floc). The amount of acid which must be added at this step 7 to end up with a floc which has enough acid in it to reduce the burning problem to an acceptable level will generally have to be determined by trial and error, keeping in mind that the less acid in the floc the better.

8. Filter out the bulk of the liquids and then dry the wet floc filter cake thus obtained by any conventional technique such as by placing it in an oven. A drying temperature not in excess of 120° F. is preferred so that the filter cake remains brittle and has less of a tendency to agglomerate after it is pulverized. We prefer to dry the floc until its moisture content is less than about 5% by weight. It is difficult to reduce the moisture content to much less than 5%, and furthermore, it is not necessary to do so. If the moisture content is much higher than 5% the powder finally obtained tends to agglomerate excessively and is more difficult to work with. In this example the dry floc comprises 55% by weight catalyzed carbon and 45% PTFE.

9. The dried floc is then reduced to a powder using a Bantam Mikro-Pulverizer manufactured by Pulverizing Machinery Division of Mikropul, Summit, N.J.; and is further reduced to submicron particle size in a Jet-O-Mizer manufactured by Fluid Energy Processing and Equipment Company of Hatfield, Pa. This step of reducing the particles to submicron size is more fully described in copending, commonly owned U.S. Pat. No. 4,177,159 titled "Catalytic Dry Powder Material For Fuel Cell Electrodes Comprising Fluorocarbon Polymer and Precatalyzed Carbon" by R. Singer filed on even date herewith.

The table below presents performance data for electrodes made by a prior art direct filtration method (A) and for electrodes made using the method of the present invention (B). In both instances the floc was made by the procedure described in the example above except that, in the prior art method, after step 7 the floc is filtered directly onto the substrate, and in the method of the present invention the floc is dried and pulverized according to steps 8 and 9 and is then applied to the substrate in the cloud chamber. The prior art electrodes had a platinum loading of 0.38 mg/cm$^2$ and the electrodes made by the present invention had a platinum loading of 0.35 mg/cm$^2$. The results are displayed purely for comparative purposes. They show that at least as good initial performance is obtainable using the lower cost method of the present invention.

| TYPICAL INITIAL ELECTRODE PERFORMANCE | | | |
|---|---|---|---|
| | | Cell Voltage (Volts) | |
| Reactants | Electrode | 100 amps/ft$^2$ | 200 amps/ft$^2$ |
| $H_2$, Air | A | .661 | .616 |
| | B | .673 | .633 |
| RM-1*, Air | A | .659 | .600 |
| | B | .668 | .619 |

*RM-1 is reformed natural gas having the following composition: 80% $H_2$, 1.7% CO, and 18.3% $CO_2$.

As heretofore discussed in the Background of the Invention, the quality of an electrode may be affected by at least the following: (1) the arrangement of carbon and polymer particles relative to each other in the catalyst layer; (2) the precise nature of the particles themselves, such as their surface chemistry; (3) the uniformity of the catalyst layer; and (4) imperfections in the catalyst layer. In the present invention the arrangement of carbon and polymer particles relative to each other is essentially determined during the floc process. The floc particles or agglomerates will retain this arrangement of particles throughout the method used to apply the floc to a substrate. On the other hand, we have found that the size of the floc particles, as they are being applied to the substrate by the method of the present invention, is important to obtaining a uniform and essentially defect free catalyst layer. Smaller floc particles tend to form a more uniform cloud as they are being drawn onto the substrate by the vacuum. If particles are too large or too heavy they fall to the substrate without proper dispersal and may result in a less uniform distribution of particles on the surface of the substrate. Also, the smaller the particles, the smaller the voids between particles in the applied layer, which also improves the uniformity of the layer. During the herein described process of applying the floc powder to the substrate the particles tend to increase in size by agglomeration. Therefore, the size of the particles which end up on the substrate are actually larger than the size of the particles of the floc powder which are introduced into the chamber. This is all the more reason to start with a floc powder having as small a particle size as possible. Since the dry floc powder also tends to agglomerate during storage, it is preferable to introduce the powder into the cloud chamber directly from the grinding apparatus.

It is believed that a powder with a mean agglomerate size no larger than about one micron and having largest particles on the order to five microns will produce the very best electrodes. The smaller the particle size the better. Reasonably good electrodes can be made using a dry floc powder having particles as large as ten microns. While electrodes made with the larger particles may not perform as well as or may not be as durable as electrodes made with micron size particles, these electrodes might be attractive for certain fuel cell applications in view of their low cost in comparison to electrodes made by prior art methods.

We have made electrodes using carbon paper substrates having a mean pore size as low as ten microns and as high as sixty microns. The method of the present invention works equally well over this entire range. Of course, as mean pore size of the substrate increases, more powder will pass therethrough and there will be a practical limit as to the maximum mean pore size which can be tolerated. When using substrates having a mean pore size from ten microns to sixty microns it is suggested to start by introducing into the chamber about ten percent more floc than the desired catalyst loading would dictate. The amount which passes through the substrate will depend upon the humidity, initial particle size of the floc powder, pore size of the substrate, and vacuum pressure being used. After processing a few trial electrodes the excess required may be more accurately determined and should remain relatively constant. Excess may be reclaimed and can be readily reconditioned for possible re-use.

As an example, for the manufacture of electrodes with an active area of 926 cm$^2$ (1 ft$^2$) and a desired 0.50 mg/cm$^2$ platinum loading, introducing 9.34 grams of the above described dry floc powder into the cloud chamber should result in the neighborhood of 8.4 grams (9.07 mg/cm$^2$) of dry floc powder on the substrate. This equates to the desired platinum loading. After a few trials a trend is established and the starting weight may be readjusted to obtain a tighter range of final catalyst loadings. If extreme accuracy is desired loading can be monitored continuously and starting weights may be adjusted accordingly.

As mentioned above, the use of phosphoric acid in the preparation of the dry floc powder is solely for the purpose of inhibiting burning of the electrodes during the high temperature sintering step in the oven 32. During early runs using the process of the present invention a not insignificant percentage of the electrodes being made were burning to an unacceptable extent during sintering in the oven 32. It was determined that at the sintering temperatures which were being used the platinum in the electrode catalyzed the burning of carbon in the presence of air. The addition of a small amount of phosphoric acid during floc preparation virtually eliminated this burning problem. The phosphoric acid coats the precatalyzed carbon particles during floc preparation and thereby reduces the surface area available to oxidation. Since our electrodes are designed for phosphoric acid electrolyte fuel cells, the presence of the phosphoric acid in the electrode has no adverse effect on electrode performance. A disadvantage of using phosphoric acid during floc preparation is that the resulting dry floc powder picks up moisture which must be removed prior to compacting the catalyst layer to prevent separation of the catalyst layer from the substrate during compaction. The oven 26 is incorporated into the process for the purpose of removing this moisture.

It should be apparent that if catalysts other than platinum are used in the fabrication of the electrode then burning during sintering may not be a problem. Furthermore, even if burning is a problem, the use of an oxidation inhibitor such as phosphoric acid is, of course, optional since other methods may be available to reduce the burning to an acceptable level. For example, sintering in a non-oxidizing atmosphere or a vacuum would solve the problem. The negative impact of the drying step in applicants' preferred embodiment is outweighed by the additional expense which would be incurred by using other means to eliminate or reduce burning of the electrode.

Upon leaving the oven 26 the floc layer is covered with a protective sheet of paper or posterboard and is compacted between rollers 28, 30. The amount of pressure used is selected to obtain maximum compaction without damaging the substrate. We have used pressures from 15–18 pounds per linear inch. The protective paper is merely for the purpose of preventing any material from sticking to the rollers and may be omitted if this does not appear to be a problem. Finally, the coated substrate is heated in an oven at a sufficiently high temperature and for a sufficiently long period of time to sinter the PTFE. Sintering temperatures may be anywhere from 600° F. to 700° F., but we prefer to sinter within a temperature range of 620° F. to 660° F. and most preferably at about 640° F.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for making an electrochemical cell electrode comprising the steps of:
applying a uniform layer of dry, powdered, carbon/hydrophobic polymer floc on the surface of a porous electrode substrate with virtually no floc within the pores of the substrate by positioning the substrate under a chamber having a bottom edge wherein the said bottom edge of the chamber fits against the edge of the substrate, dispersing the floc as a cloud of powder in the chamber over said surface of said positioned substrate and pulling the floc onto said surface by drawing a continuous vacuum under the substrate until the desired amount of powder has been deposited, wherein said substrate is graphitized carbon paper made from carbon fibers;
compacting the applied floc layer; and,
sintering the compacted layer.

2. The method according to claim 1 wherein the hydrophobic polymer is PTFE.

3. The method according to claim 1 wherein the electrode substrate has an open porosity of at least 80%.

4. The method according to claim 1 wherein the particle size of the floc powder is no greater than about ten microns.

5. The method according to claim 1 wherein the carbon particles in the floc are precatalyzed.

6. The method according to claim 1 wherein the floc is a precatalyzed carbon/PTFE floc, the catalyst comprising platinum.

7. The method according to claim 1 wherein the mean particle size of the powdered floc is no greater than about one micron.

8. A method for making an electrochemical cell electrode comprising the steps of:
forming a co-suspension of carbon particles and hydrophobic polymer particles;
floccing the co-suspension;
drying the floc so produced and reducing it to a powder;
applying a uniform layer of the powder on the surface of a porous electrode substrate with virtually no floc within the pores of the substrate by positioning the substrate under a chamber having a bottom edge wherein the said bottom edge of the chamber fits against the edge of the substrate, dispersing the floc as a cloud of powder in the chamber over said surface of said positioned substrate and pulling the floc onto said surface by drawing a continuous vacuum under the substrate until the desired amount of powder has been deposited, wherein said substrate is graphitized carbon paper made from carbon fibers;
compacting the applied floc layer; and,
sintering the compacted layer.

9. The method according to claim 8 wherein the dry floc powder particles have a mean particle size of about one micron or less.

10. The method according to claim 9 wherein the polymer comprises PTFE and the carbon particles are precatalyzed.

11. The method according to claim 9 wherein the electrode substrate has an open porosity of at least 80%.

12. The method according to claim 10 wherein the catalyst is platinum, said dry floc powder includes a small amount of phosphoric acid, and before compacting said floc layer moisture accumulated therein is removed by heating said layer.

13. The method according to claim 9 wherein the maximum particle size of the floc is about ten microns.

14. The method according to claim 1 or 8 wherein the step of dispersing the floc in the chamber includes introducing a predetermined amount of the floc into the chamber and maintaining the vacuum until all of said predetermined amount of floc has been drawn to the surface.

* * * * *